(12) United States Patent
Prevost et al.

(10) Patent No.: US 9,598,179 B2
(45) Date of Patent: Mar. 21, 2017

(54) CONDUCTIVE ATTACHMENT DEVICE

(71) Applicant: Goodrich Corporation, Charlotte, NC (US)

(72) Inventors: Craig E. Prevost, Phoenix, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 27 days.

(21) Appl. No.: 14/746,526

(22) Filed: Jun. 22, 2015

(65) Prior Publication Data
US 2016/0368619 A1 Dec. 22, 2016

(51) Int. Cl.
| | |
|---|---|
| B64C 1/22 | (2006.01) |
| B64D 1/08 | (2006.01) |
| B64D 9/00 | (2006.01) |
| B64D 45/02 | (2006.01) |
| B64D 25/14 | (2006.01) |
| H05F 3/02 | (2006.01) |

(52) U.S. Cl.
CPC ............. *B64D 45/02* (2013.01); *B64D 25/14* (2013.01); *H05F 3/02* (2013.01)

(58) Field of Classification Search
CPC ........ B64D 45/02; B64D 25/08; B64D 25/14; H05F 3/02
See application file for complete search history.

(56) References Cited

U.S. PATENT DOCUMENTS

| | | | | | |
|---|---|---|---|---|---|
| 3,621,383 | A | * | 11/1971 | Rush | B64D 25/14 182/48 |
| 3,656,579 | A | * | 4/1972 | Fisher | B64D 25/14 182/48 |
| 5,542,629 | A | * | 8/1996 | Kashihara | B64D 25/14 182/48 |
| 2004/0094361 | A1 | | 5/2004 | Gronlund et al. | |

FOREIGN PATENT DOCUMENTS

GB 1442711 A 7/1976

OTHER PUBLICATIONS

EP SR in EP Application No. 16175776.0, Issued Nov. 18, 2016, 5 pages.

* cited by examiner

*Primary Examiner* — Richard G Davis
(74) *Attorney, Agent, or Firm* — Cantor Colburn LLP

(57) ABSTRACT

A method and system to provide an electrical connection and a releasable attachment includes a girt sleeve having a plurality of lacings, wherein at least one lacing of the plurality of lacings is an electrically conductive lacing, and a girt having a plurality of openings to receive the plurality of lacings, wherein the girt sleeve and the girt are in electrical communication via the electrically conductive lacing when releasably attached.

19 Claims, 2 Drawing Sheets

CONDUCTIVE ATTACHMENT DEVICE

BACKGROUND

The subject matter disclosed herein relates to attachment systems, and more particularly, to a system and a method for providing an electrical connection and a releasable attachment for an evacuation device.

Typically, inflatable evacuation slides are utilized to provide evacuation routes for aircraft occupants. Often, static electricity can build up on such inflatable evacuation slides, requiring a conductive path between the aircraft and the ground to prevent the build-up of static electricity. The addition of a conductive path can require additional components, complexity, and assembly.

BRIEF SUMMARY

According to an embodiment, an attachment device includes a girt sleeve having a plurality of lacings, wherein at least one lacing of the plurality of lacings is an electrically conductive lacing, and a girt having a plurality of openings to receive the plurality of lacings, wherein the girt sleeve and the girt are in electrical communication via the electrically conductive lacing when releasably attached.

According to an embodiment, a method to provide an electrical connection and a releasable attachment includes providing a girt sleeve having a plurality of lacings, wherein at least one lacing of the plurality of lacings is an electrically conductive lacing, receiving the plurality of lacings via a girt having a plurality of openings, releasably attaching the girt sleeve and the girt via the plurality of lacings, and electrically connecting the girt sleeve and the girt via the electrically conductive lacing.

According to an embodiment, an evacuation system includes a packboard, an evacuation device releasably attached to the packboard via an attachment device, the attachment device includes a girt sleeve having a plurality of lacings, wherein the girt sleeve is coupled to the packboard and at least one lacing of the plurality of lacings is an electrically conductive lacing, and a girt having a plurality of openings to receive the plurality of lacings, wherein the girt is coupled to the evacuation device, and the girt sleeve and the girt are in electrical communication via the electrically conductive lacing when releasably attached.

Technical function of the embodiments described above includes that at least one lacing of the plurality of lacings is an electrically conductive lacing.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
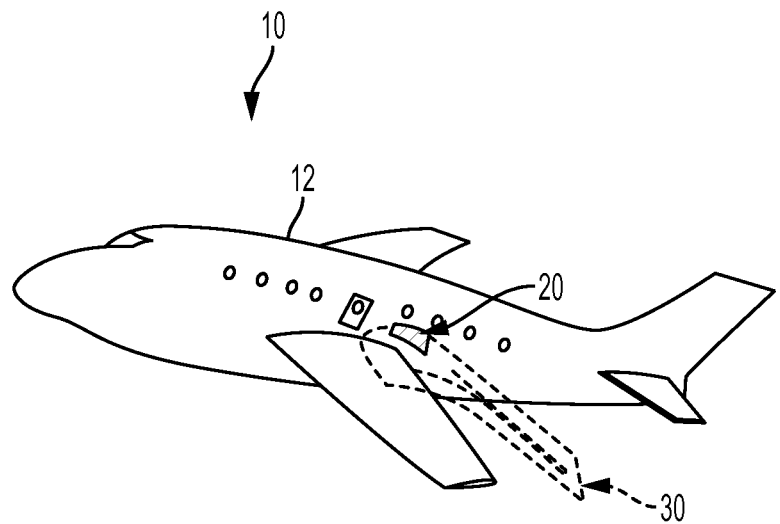
FIG. 1 illustrates a pictorial view of one embodiment of an aircraft for use with an inflatable slide.

Referring now to the drawings, FIG. 1 shows an aircraft 10. In the illustrated embodiment, the aircraft 10 includes an aircraft body 12, a packboard 20, and an inflatable slide 30. The aircraft 10 can be any suitable aircraft. In the illustrated embodiment, the aircraft 10 is a passenger aircraft with the inflatable slide 30 suitable for evacuation purposes. The inflatable slide 30 can be stored in the packboard 20 when the inflatable slide 30 is not deployed. The packboard 20 can be attached or otherwise coupled to the aircraft body 12. In certain embodiments, the packboard 20 is in electrical communication with the aircraft body 12. In FIG. 1 the inflatable slide 30 is shown deployed and attached to the aircraft body 12. In certain embodiments, the inflatable slide 30 can be detached from the aircraft body 12 to serve as a floatation device. In the illustrated embodiment, the inflatable slide 30 is electrically connected to a ground surface and the aircraft body 12 via the packboard 20 and the attachment device disclosed herein. Advantageously, such an electrical connection can prevent the buildup of static electricity on the inflatable slide 30.

Figure 2:
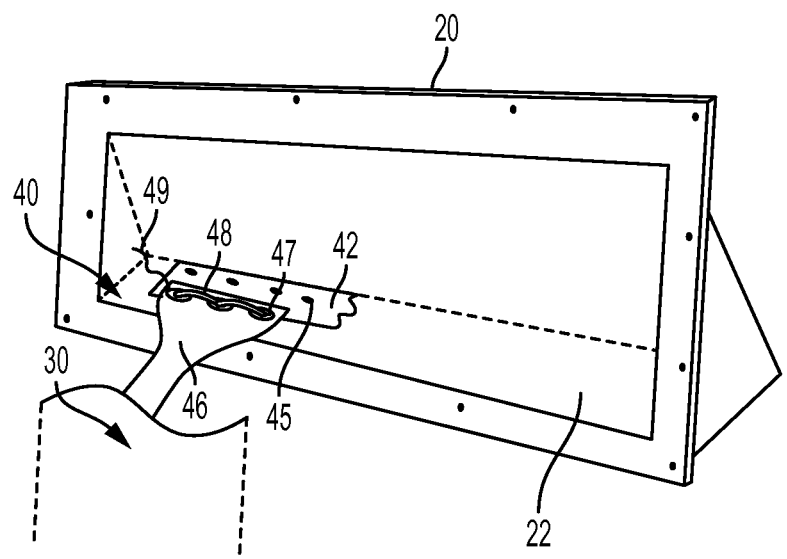
FIG. 2 is a pictorial view of one embodiment of a packboard and an attachment system for use with the inflatable slide.

FIG. 2 shows the packboard 20 and an attachment system 40 for attaching the inflatable slide 30 to the packboard 20. In the illustrated embodiment, the packboard 20 has a packboard mounting surface 22 that provides an interface for attachment system 40. In the illustrated embodiment, the attachment system 40 includes a girt sleeve 42, a girt 46 and lacings 48. In the illustrated embodiment, the attachment system 40 facilitates an electrical and structural connection between the inflatable slide 30 and the packboard 20.

Figure 3:
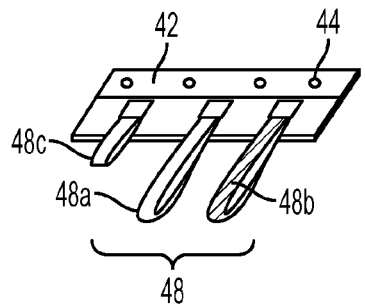
FIG. 3 is a pictorial view of one embodiment of a girt sleeve of the attachment system of FIG. 2.

Referring to FIG. 3, the girt sleeve 42 is shown. In the illustrated embodiment, the girt sleeve 42 includes fastener holes 44, and lacings 48. The girt sleeve 42 allows for attachment with the packboard 20 via packboard mounting surface 22. The girt sleeve 42 can be made of any suitable material. In the illustrated embodiment, the girt sleeve 42 is formed of an electrically conductive fabric, including, but not limited to an aluminized fabric, a fabric with a conductive coating, etc.

In the illustrated embodiment, the girt sleeve 42 can be affixed to the packboard mounting surface 22 via fasteners 45 (shown in FIG. 2) mounted through fastener holes 44. Advantageously, the fasteners 45 provide a structural and electrical coupling of the girt sleeve 42 to the packboard 20. In certain embodiments, the girt sleeve 42 is attached or assembled to a girt bar. The use of a girt bar allows the attachment system 40 to interface with floor fittings as required.

In the illustrated embodiment, the lacings 48 are coupled or otherwise attached to the girt sleeve 42. In the illustrated embodiment, the lacings 48 are sewn to the girt sleeve 42. The lacings 48 can provide a releasable attachment to the girt 46 while providing an electrically conductive pathway between the girt sleeve 42 and the girt 46. In the illustrated embodiment, the lacings 48 are formed from webbing material. The lacings 48 can be formed in any suitable shape, including, but not limited to, loops, straps, or any other suitable configuration to facilitate attachment with the girt 46. In the illustrated embodiment, a non-conductive lacing 48a is formed from a non-conductive material. The non-conductive lacing 48a can be utilized to provide a structural attachment to the girt 46. In the illustrated embodiment, a conductive lacing 48b is shown. The conductive lacing 48b can be formed from a conductive material, including, but not limited to, an aluminized fabric or webbing, a fabric or webbing with a conductive coating, etc. Advantageously, the conductive lacing 48b can provide an electrically conductive pathway as well as a structural attachment to the girt 46. In the illustrated embodiment, the girt sleeve 42 can include at least one conductive lacing 48b. In other embodiments, the girt sleeve 42 can include any suitable number of conductive lacings 48b. In the illustrated embodiment, a terminal lacing 48c can be utilized to releasably attach the other lacing 48a, 48b by interfacing with a pull pin 49 (shown in FIG. 5).

Figure 4:
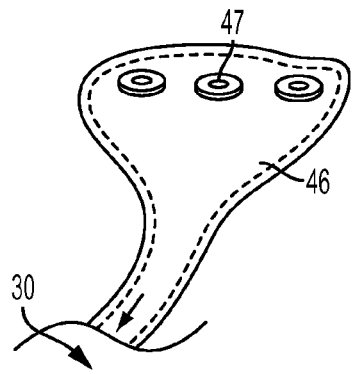
FIG. 4 is a pictorial view of one embodiment of a girt of the attachment system of FIG. 2.

Referring to FIG. 4, a girt 46 is shown. In the illustrated embodiment, the girt 46 includes grommets 47 and allows for attachment with the inflatable slide 30. The girt 46 can be made of any suitable material. In the illustrated embodiment, the girt 46 is formed of an electrically conductive fabric, including, but not limited to an aluminized fabric, a fabric with a conductive coating, etc.

In the illustrated embodiment, the girt 46 can be affixed to the inflatable slide 30 via a sewn connection or any other suitable connection. The girt 46 can be in structural and electrical communication with the inflatable slide 30 for attachment and to allow the dissipation of static electricity buildup.

In the illustrated embodiment, the grommets 47 are lined openings to receive the lacing 48 from the girt sleeve 42. The grommets 47 can be formed of any suitable material, including conductive materials, such as steel, etc. The grommets 47 can reinforce the girt 46 to prevent tears when coupled to the girt sleeve 42. In certain embodiments, the grommets 47 can facilitate electrical conduction between the girt sleeve 42, the lacing 48, and the girt 46.

Figure 5:
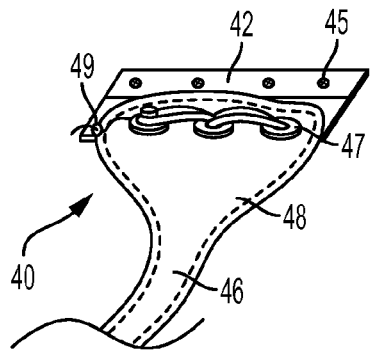
FIG. 5 is a pictorial view of the assembled attachment system.

Referring to FIG. 5, an assembled attachment system 40 is shown. In the illustrated embodiment, the girt sleeve 42 is releasably attached to the girt 46 via the lacings 48. Advantageously, the electrical conductive properties of the girt sleeve 42, the lacings 48, and the girt 46 allows for a structural and electrical connection to allow for electric charge, such as static electricity buildup, to flow between the inflatable slide 30, the aircraft body 12 via the packboard 20, and the electrical ground.

In the illustrated embodiment, the lacings 48 are disposed through the grommets 47 and looped over an adjacent lacing 48. The lacings 48 in conjunction with the grommets 47 secure the girt sleeve 42 and the girt 46. In the illustrated embodiment, a pull pin 49 is engaged at the terminal lacing 48c to retain the lacings 48 in the grommets 47. Advantageously, the pull pin 49 allows for the lacings 48 to be quickly disengaged by removing pull pin 49 to allow the girt sleeve 42 and the girt 46 to be disengaged, which in turn allows the inflatable slide 30 to be disengaged from the aircraft body 12. In certain embodiments, the inflatable slide 30 can be used as a raft.

Advantageously, the at least one electrically conductive lacing 48 of the attachment device 40 allows a single attachment device to provide for a structural attachment and an electrical connection. Attachment device 40 allows for reduced part costs, assembly time, packboard 20 volume, and total weight. Further, during deployment of the inflatable slide 30 the use of the at least one electrically conductive lacing 48 eliminates additional components that can introduce snagging hazards. In certain embodiments, the attachment device 40 can be utilized to provide releasable attachment and electrical connections for any suitable device or system.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An attachment device comprising:
    a girt sleeve having a plurality of lacings, wherein at least one lacing of the plurality of lacings is an electrically conductive lacing; and
    a girt having a plurality of openings to receive the plurality of lacings, wherein the girt sleeve and the girt are in electrical communication via the electrically conductive lacing when releasably attached.

2. The attachment device of claim 1, wherein the plurality of openings each have a respective conductive grommet.

3. The attachment device of claim 1, wherein the girt sleeve is formed of a conductive coated fabric.

4. The attachment device of claim 1, wherein the girt is formed of a conductive coated fabric.

5. The attachment device of claim 1, wherein the electrically conductive lacing is formed of a conductive coated fabric.

6. The attachment device of claim 1, wherein the plurality of lacings are releasably attached to the plurality of openings via a pull-pin.

7. A method to provide an electrical connection and a releasable attachment, comprising:
    providing a girt sleeve having a plurality of lacings, wherein at least one lacing of the plurality of lacings is an electrically conductive lacing;
    receiving the plurality of lacings via a girt having a plurality of openings;
    releasably attaching the girt sleeve and the girt via the plurality of lacings; and
    electrically connecting the girt sleeve and the girt via the electrically conductive lacing.

8. The method of claim 7, wherein the plurality of openings each have a respective conductive grommet.

9. The method of claim 7, wherein the girt sleeve is formed of a conductive coated fabric.

10. The method of claim 7, wherein the girt is formed of a conductive coated fabric.

11. The method of claim 7, wherein the electrically conductive lacing is formed of a conductive coated fabric.

12. The method of claim 7, further comprising releasably attaching the plurality of lacings to the plurality of openings via a pull-pin.

13. An evacuation system comprising:
    a packboard;
    an evacuation device releasably attached to the packboard via an attachment device,
    the attachment device comprising:

a girt sleeve having a plurality of lacings, wherein the girt sleeve is coupled to the packboard and at least one lacing of the plurality of lacings is an electrically conductive lacing;

a girt having a plurality of openings to receive the plurality of lacings, wherein the girt is coupled to the evacuation device, and the girt sleeve and the girt are in electrical communication via the electrically conductive lacing when releasably attached.

14. The evacuation system of claim 13, wherein the plurality of openings each have a respective conductive grommet.

15. The evacuation system of claim 13, wherein the girt sleeve is formed of a conductive coated fabric.

16. The evacuation system of claim 13, wherein the girt is formed of a conductive coated fabric.

17. The evacuation system of claim 13, wherein the electrically conductive lacing is formed of a conductive coated fabric.

18. The evacuation system of claim 13, wherein the plurality of lacings are releasably attached to the plurality of openings via a pull-pin.

19. The evacuation system of claim 13, wherein the evacuation device is an inflatable slide.

* * * * *